United States Patent [19]

Edenäs

[11] Patent Number: 4,787,804
[45] Date of Patent: Nov. 29, 1988

[54] MATERIAL HANDLING SYSTEM

[75] Inventor: Bernt Edenäs, Västerås, Sweden

[73] Assignee: Aktiebolaget Knight Konsulterande Ingenjorer, V teräs, Sweden

[21] Appl. No.: 175,596

[22] Filed: Mar. 25, 1988

Related U.S. Application Data

[63] Continuation of Ser. No. 906,740, Sep. 11, 1986, abandoned.

[30] Foreign Application Priority Data

Sep. 16, 1985 [SE] Sweden .............................. 85042711

[51] Int. Cl.$^4$ .......................... B66F 9/07; B65G 1/04
[52] U.S. Cl. ...................................... 414/281; 414/254
[58] Field of Search ............... 414/273, 279, 281, 286, 414/233–235, 253, 254

[56] References Cited

U.S. PATENT DOCUMENTS

| | | | |
|---|---|---|---|
| 2,707,054 | 4/1955 | Alimanestiano | 414/254 |
| 3,719,288 | 3/1973 | Schmitt et al. | 414/281 |
| 3,817,406 | 6/1974 | Sawada et al. | 414/279 |
| 3,883,013 | 5/1975 | Nakanishi et al. | 414/281 |
| 3,896,955 | 7/1975 | Collins et al. | 414/254 |

FOREIGN PATENT DOCUMENTS

| | | | |
|---|---|---|---|
| 139058 | 5/1985 | European Pat. Off. | |
| 3012826 | 10/1981 | Fed. Rep. of Germany | 414/281 |
| 1245500 | 9/1960 | France | 414/254 |
| 1289447 | 2/1962 | France | 414/254 |
| WO85/01493 | 4/1985 | PCT Int'l Appl. | |
| 1253923 | 11/1971 | United Kingdom | 414/254 |
| 2153801 | 8/1985 | United Kingdom | |

Primary Examiner—Leslie J. Paperner
Assistant Examiner—David A. Bucci
Attorney, Agent, or Firm—Frishauf, Holtz, Goodman & Woodward

[57] ABSTRACT

An automatic material handling system includes two or more vertically extending staging structures (10) incorporating a plurality of shelving surfaces (24) arranged in rows in respective staging structures for accommodating transport pallets or like goods carriers. The system also includes a loading station (15) and an input/output station (16) for serving a machine tool. The aforementioned three system auxiliaries are placed in a row along a track (14) with a movable a carriage structure (12). The carriage structure includes a load carrier (26) having load-support surfaces which while overlapping the shelving surfaces (24) are able to pass vertically therethrough. A compact system requiring the least possible floor space is thus provided. In addition, the system can be suitably controlled by a computer, so as to obtain a fully automatic material handling system.

14 Claims, 3 Drawing Sheets

MATERIAL HANDLING SYSTEM

This is a continuation, of application Ser. No. 906,740, filed Sept. 11, 1986, now abandoned.

The present invention relates to a material handling system, intended preferably for automatic operation in conjunction with machine tools, such as lathes, milling machines and like, tools in which component parts and similar workpieces are machined essentially in the absence of a machine operator, or in accordance with the FMS-system.

Present day material handling systems normally comprise roller paths having arranged therealong, in one way or another, storage stations in which materials, workpiece-blanks and like details are stored on pallets or like carriers. One drawback with all material handling systems of this kind is that they require a large area of floor space in the vicinity of respective machine tools served by the system.

Consequently, one object of the present invention is to eliminate this drawback. To this end there is provided in accordance with the invention a material handling system which comprises a plurality of vertically extending staging structures arranged in side-by-side relationship and provided with outwardly projecting shelving surfaces, these surfaces being adapted to the length, width and height of a loaded transport pallet or like goods carrier, so that a carriage structure provided with a load-carrying arm and arranged for movement along a track in front of respective staging structures is able to move the pallet between an associated loading station and a specific shelving surface in a respective staging structure. The load-support surface of the loading station and the shelving surfaces of the staging structures are located in a common vertical plane in which also the load-carrier is movable thereby overlapping said surfaces. The load-carrier has a form which enables the carrier to at least partially pass vertically through said support surfaces when a pallet is to be lifted or set down. Arranged adjacent each staging structure is a horizontal passage and a vertical passage, which are so constructed as to enable the load carrier loaded with pallet to pass therethrough. A further object of the invention is to provide a system comprising as few movable parts as possible, so as to obtain an operationally reliable and simple system. A third object is to provide a stable, closed unit which will ensure that each workpiece or piece of goods handled by the system is positioned in accordance with and retained on a given, specific coordinate of a data controlled positioning coordination system, without the risk of being influenced by external sources. Other objects of the invention and advantages afforded thereby will be apparent from the following description. These objects and advantages are achieved by the characterizing features set forth in the following claims.

The invention will now be described in more detail with reference to the accompanying drawings, in which FIG. 1 is a perspective view of a material handling system according to the invention; and FIG. 2 is a perspective view of an alternative embodiment of the invention.

Figure 1:
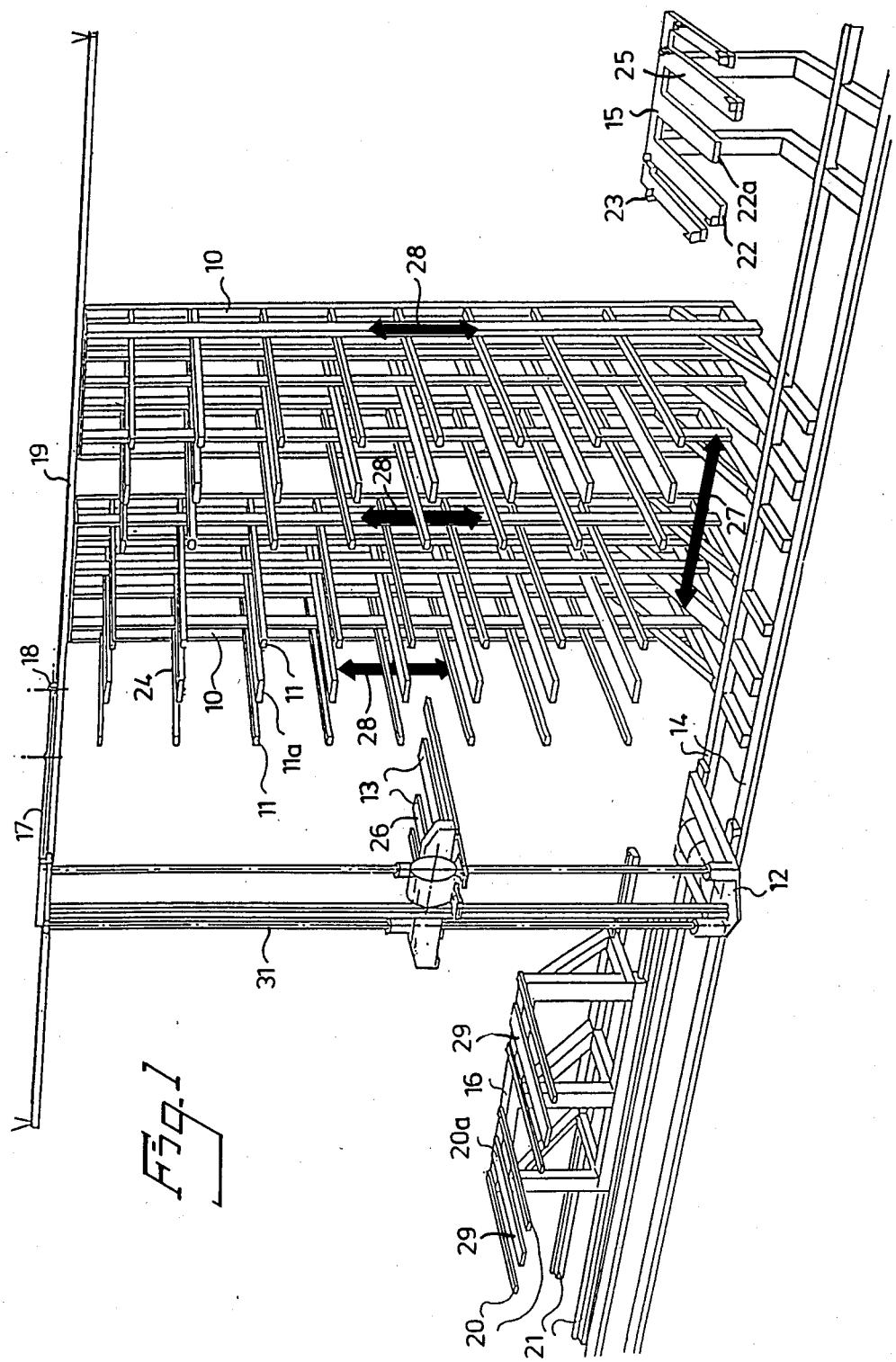

The system according to FIG. 1 includes two load-support staging structures 10, a loading station 15, an input and output station 16, and a carriage structure 12 which is arranged to run on tracks 14 located in front of the aforesaid system auxiliaries 10, 15, 16, and which comprises a vertically extending column 31 and a load carrier 26 having horizontally extending carrier arms 13 and being arranged for vertical movement along the column 31 in the vertical direction of the staging structures 10. The two staging structures 10, the loading station 15, the input/output station 16, and the carriage structure 12 are mutually combined to form a unit which requires the minimum of floor space. In order to prevent bending of the carriage 12 from the vertical plane during its travel between the various stations, the carriage structure is provided with an arm 17 having on the end thereof remote from the column 31 a support roller 18 which engages a rail 19 firmly attached to the rear part of respective staging structures 10, and, for example, to the ceiling structure above the loading station 15 and the input/output station 16, the roller 18 rolling along the rail 19 as the carriage structure moves along the tracks 14.

The staging structures 10 are intended to support transport pallets or other goods carriers on a plurality of shelving levels or surfaces 24. The shelving surfaces 24 project out horizontally towards the carrier arms 13 of the load carrier 26, which are counter-directed to the shelving surfaces, so that the shelving surfaces and the load carrier overlap one another. The load carrier and the shelving surfaces are mutually arranged in a manner which enables the load carrier to pass vertically through the shelving levels, in a manner hereinafter made apparent, to enable loads to be deposited onto and lifted from the shelving surfaces in respective levels.

Each shelving surface is preferably formed by a plurality of support arms 11, 11a, e.g. from two to five in number, although in certain cases the surfaces may be substantially of unitary construction. The support arms of each staging structure are arranged one above the other in vertical rows having an interspacing commensurate with the size of a loaded transport pallet, so that the load carrier has sufficient space to transport the pallets to and from given locations in the staging structures.

In the embodiment illustrated in FIG. 1 the staging structures 10 are erected so as to leave a vertical passageway 28 between respective structures, such that goods can be loaded and off-loaded in an unimpeded manner. Corresponding passageways 28 are also provided on the outer surfaces of respective staging structures. A horizontal passageway 27 is provided between the floor structure supporting the system and the lowermost shelving level, so that a loaded load-carrier can be moved across the staging structures to and from the loading station 15 or to and from the input/output station 16. Further horizontal passageways may also be provided, e.g. adjacent the top of the vertical staging structures.

As beforementioned, and as illustrated in FIG. 1, the load carrier 26 is mounted on the vertical column 31 carried by the carriage 12, for vertical movement up and down respective staging structures. Movement of the carriage 12 along the tracks 14 and movement of the load carrier 26 on the column 31 between respective shelving levels is suitably effected by means of rack drivers in conjunction with frequency controlled gear motors. The carrier or lifting arms 13 of the load carrier 26 are spaced apart at a distance which enables said arms to pass inwardly of the two outer support arms 11 of respective staging structures 10, on each side of a centre arm 11a.

The loading station 15 is arranged in line with the vertical staging structures 10 along the tracks 14 and includes a load-support surface 25 which, similar to the shelving surfaces 24 of the shelving levels in respective staging structures, has an extension and form such that the load carrier 26 will overlap the load-support surface 25, said load-support surface being constructed in a manner to allow the load carrier 26 to pass vertically therethrough. The loading station is intended to receive and to dispatch goods or mechanical components transported to and from the system. When the illustrated system is to serve a machine tool, the loading station may also be used to stack workpieces manually into a pallet or like support means in accordance with a specific loading pattern, suitably so that each workpiece can be gripped mechanically by a loading robot or a portal loader of the machine tool. The loading station may be provided with additional load-support surfaces 25, thereby to facilitate the handling of materials in said station, and may also be provided with working platens or the like.

The load-support surface 25 of the illustrated loading station comprises load-support arms 22 and 22a which are formed and positioned in a manner similar to the support arms 11 of the shelving levels 24. In order to ensure correct positioning of the transport pallet or like goods carrier in the loading station, the support arms 22, 22a are provided with guide angles 23 which guide the pallet or like goods carrier to its correct position with regard to the location of the items of goods loaded thereon, in accordance with a set pattern of loading coordinates. The loading station is also constructed to receive pallets or like goods carriers transported along the tracks 14, i.e. at right angles to the normal loading direction.

The input/output station 16 is also positioned adjacent the tracks 14, although on the opposite side of the vertical staging structures 10 to the loading station 15, and comprises a load-support surface 29 on which pallets or goods are loaded for intermediate storage prior to being transported to and from a machine tool. The illustrated input/output station incorporates two load-support surfaces 29, of which one is used to support pallets for tansportation, for example, to a portal loader, and the other is used as a pallet support for pallets transported to and from the station by the carriage structure 12. It will be understood that further load-support surfaces 29, or stations 16, can be placed along the tracks 14 when the system is to serve a plurality of machine tools.

The load-support surfaces of the input/output stations 16 may have the same form and extension as the shelving surfaces 24 and are provided with the same number of support arms 20 and 20a as the shelving surfaces. The station 16 is also guided for movement along a track 21 extending parallel with the tracks 14 along which the carriage structure 12 moves. When the input/output station 16 serves a machine tool via a portal loader or a loading robot, it must be possible to move the station together with the transport pallets or goods carriers stored thereon in order to feed the portal loader, at the same time as it must be possible to step, or index the station through distances equal to the linear distance of the pattern of coordinates according to which the various workpieces are loaded. This movement and stepping, or indexing, of the input/output station 16 is effected by the carriage structure 12. For example, the load-carrying arms 13 of the carriage structure 12 may be arranged to engage the input/output station 16 and to move the same in response to signals transmitted in accordance with a program stored in a computer controlling the system.

As beforementioned, the load carrier 26 is movable solely along the tracks 14 and vertically along the column 31, and hence the pattern of coordinates programmed in the system control computer is such that when the load carrier has collected a transport pallet or like goods carrier from the loading station 15 and is to off-load the pallet, for example, in the right-hand staging structure 10, the carriage is first moved together with its load to a location in front of the staging structure. The computer identifies a vacant shelving space and simultaneously stores the location of this space in its memory, while causing the load carrier 26 to be raised to a level immediately above the three load-support arms 11, 11a, of the shelving surface of said space, and then in over said three load-support arms. The load is then lowered onto the load-support arms 11, 11a, and the bifurcated load-carrier arms 13 of the load carrier 26 are moved down to a location immediately beneath the load-support arms 11, 11a although well clear of an underlying located transport pallet or the like, whereafter the carriage structure together with its load carrier can be moved to the right or to the left away from the staging structure.

When collecting a transport pallet or like goods carrier from, for example, the right-hand staging structure in response to a signal from the machine tool to the computer, the movement pattern of the carriage structure is the reverse of the aforedescribed pattern. In order to enable the load to be transported to the input/output station 16, the carriage structure 12 is controlled always to transport the load, or just the load-support arms 13 when unloaded, into the horizontal passageway beneath the three lowermost load-support arms 11 and 11a. The latter arms being positioned with enough to provide adequate headway for a carried load entering or leaving interior passageways as of into the staging structures 10. When off-loading transport pallets or like load carriers in the left-hand staging structure, the movement pattern of the carriage structure and the load carrier is the same as that for the right-hand staging structure, although in this case the load-carrying structure must first pass beneath the latter aforementioned load-support arms of both staging structures in order to reach the left-hand side of the left-hand staging structure and then off-load the pallet in said structure. Normally, however, incoming loaded transport pallets or like carriers from the loading station 15 are primarily loaded into the right-hand staging structure, while pallets with machined workpieces from the input/output stations 16 are off loaded in the left-hand staging structure, for further transport by the carriage structure, to the loading station 15.

Figure 2:
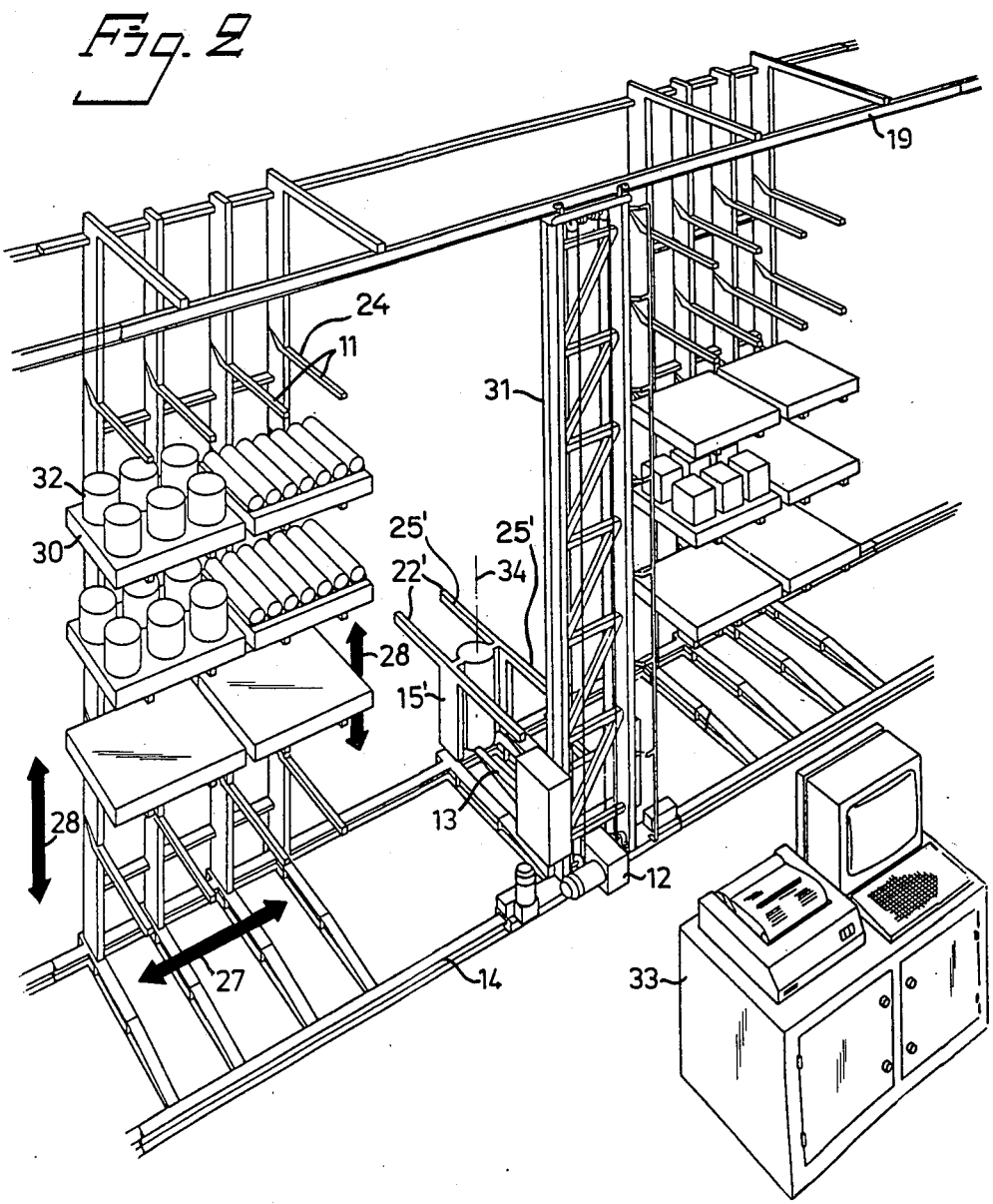

The system illustrated in FIG. 1 comprises solely two staging structures 10 in side-by-side relationship. When more than two staging structures are required along the tracks 14, the additional staging structures are preferably placed adjacent the aforedescribed staging structures, so as to form two groups of mutually adjacent staging structures, as illustrated in FIG. 2. Each group of staging structures shall be separated from the other by a distance sufficient to enable the load-carrier to transport a transport pallet or like carrier in the vertical passage 28 between the two groups of staging structures for off loading goods into and collecting goods from said structures.

The distance between the loading station 15 and the right-hand staging structure 10, and the distance between the left-hand staging structure 10 and the input-/output station 16 is suitably just sufficient to enable the loaded load-carrier 26 to move vertically between said staging structures, so that the material handling system occupies the minimum of floor space.

The embodiment illustrated in FIG. 2 includes a loading station 15' having two load-support arms 22' forming two support surfaces 25'. Each support surface 25' can be rotated about a common vertical axis 34, so as to enable the positions of the surfaces 25' to be mutually interchanged. This enables workpieces or goods to be arranged in a positioning pattern without interruption of in readiness for the carriage structure 12, 31, which may be employed in other work while said workpieces or goods are being positioned. The load support and shelving surfaces 25', 24 of the FIG. 2 embodiment have solely two support arms 22', 11 for supporting the pallets, here referenced 30. In this case, the carrier arms 13 of the load carrier are arranged to pass inwardly of the opposing support arms forming the shelving surfaces. The carriage structure 12 is moved along solely one track 14 arranged in the floor structure and a single rail 19 arranged in the uppermost part of the system, thereby rendering the system more compact. A monitoring console 33 incorporating the system control computer may be arranged in the vicinity of the system. Although the illustration of FIG. 2 does not include an input/output station it will be understood that one such station, similar to that illustrated in FIG. 1, may be provided when the system is to serve a machine tool or the like. In certain cases, however, the loading station 15 may function as an input/output station, in which case a robot charger may be arranged to grip the workpieces or like goods placed on an outwardly swung load-support surface.

Figure 3:
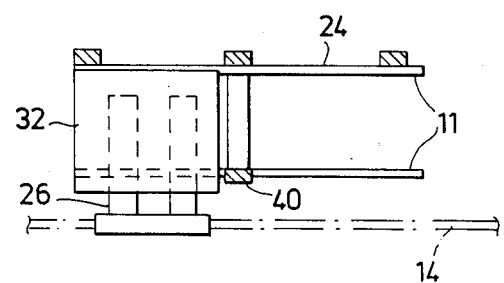
FIG. 3 is a view from above of a couple of staging structures forming part of another embodiment of the invention.
Figure 4:
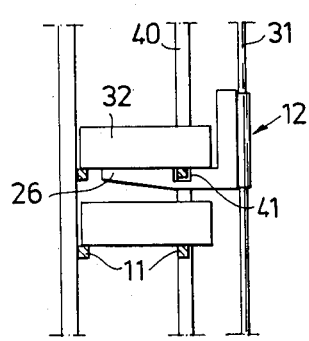
FIG. 4 is a side view of the structures according to FIG. 3 and a load carrier used in the system.

Still another embodiment will be seen in FIGS. 3 and 4 which show a system wherein the shelving surfaces 24 of the staging structures 10 have support arms 11 which run in parallel to the movement path 14 of the carriage structure 12. This construction will enable an outer pillar 40 to support the surfaces 24 which in some cases makes the structures more stable and simple than the aforementioned embodiments which had support arms extending at right angles to said movement path. The movement of the load carrier will, however, be somewhat more complicated since the carrier cannot pass altogether through the shelving surfaces but has to be laterally inserted under each surface by means of the carriage structure 12. To be able to lift or deposit loads 32 the carrier is arranged in such a way that it does not come into contact with the support arms 11, e.g. by means of a notch 41. Thus, the total height of a staging structure of this kind will be a little lower since only a part of the carrier has to be able to pass between a shelving surface and a load lying under said surface, see FIG. 4.

The staging structures 10 and the load-support arms 11 and 11a of the described invention are assumed to be constructed to support solely transport pallets of standardized sizes or goods carriers of a similar size or of sizes down to about 400×400 mm. It will be understood, however, that the staging structures can be constructed to accommodate other forms of goods carriers. In addition, the load carrier may comprise solely one carrier or lift arm having the form, for example, of a cross so as to better support the load, while the respective load-support arms of the staging structures, the loading station, and the input/output station may have the form of a plate with corresponding holes or apertures, and hence the described embodiments of an automatic material handling system according to the invention can be modified with regard to construction and size within the scope of the following claims.

I claim:

1. A material handling system suitable for machine tools or the like, comprising:

a carriage assembly having a vertically extending column, a load carrier, means for moving said load carrier vertically along said column, and means for moving said carriage assembly horizontally along a first given direction, said load carrier extending horizontally away from said column in a second given direction perpendicular to said first given direction;

a staging structure having a front, a back, and two sides, and comprising a plurality of horizontal supporting surfaces spaced from each other by a vertical space, said first given direction being between said two sides and parallel to the front, and said second given direction being from the front to the back, at least one side of the staging structure being open to admit a transporting pallet loaded on said load carrier therethrough;

a loading station positioned laterally of said staging structure along said first given direction, and including at least one horizontal supporting surface;

said load carrier extending in said second given direction to overlap the supporting surfaces of the staging structure and loading station to be in an overlapping position when located, respectively, in front thereof;

means on at least one of said load carrier and the supporting surfaces of both the staging structure and loading station for permitting relative vertical movement therebetween so that an upper surface of the load carrier can be moved between a height at least equal to that of an upper surface of said supporting surfaces and a height below a lower surface of the supporting surfaces while being in said overlapping position; and a horizontal passage along the first given direction passing completely through the staging structure to said loading station, and extending widthwise from the front toward the back of the staging structure, and a vertical passage adjacent the at least one open side of said staging structure, said vertical passage being in communication with said horizontal passage and with each said vertical space between adjacent supporting surfaces of the staging structure; and said vertical and horizontal passages, and each said vertical space, being sized to accommodate said transporting pallet loaded on the load carrier, said carriage assembly moving means being for moving said carriage assembly between the staging structure and loading station with the load carrier being in said horizontal passage.

2. The material handling system of claim 1, wherein said moving means moves said carriage assembly along a path placing said vertically extending column at least at a preselected distance from, respectively, the front-most portions of the horizontal supporting surfaces of the staging structure.

3. The material handling system of claim 2, wherein the front-most portion of all the horizontal supporting surfaces of the staging structure are in a vertical plane extending parallel to both the first given direction and the vertically extending column.

4. The material handling system of claim 3, wherein the front of the staging structure is at least partially open at said vertical space between adjacent horizontal surfaces to accommodate the load carrier as it reaches said overlapping position by entering such vertical space from said at least one open side thereof.

5. The material handling system of claim 4, wherein said means for permitting relative vertical movement between the load carrier and supporting surfaces of the staging structure comprises a first plurality of elongated spaces defined in said load carrier, open at a distal end thereof, and extending toward the column along said second given direction, and a second plurality of elongated spaces defined in said supporting surfaces of the staging structure, open at the front, and extending toward the back along said second given direction, said first and second plurality of spaces being sized such as to accommodate vertical passage of the load carrier through a supporting surface in said overlapping position.

6. The material handling system of claim 5, wherein said means for permitting relative vertical movement between the load carrier and supporting surfaces of the staging structure comprises a plurality of arms mounted on the horizontal supporting surfaces to extend along said first given direction and including a front-most arm and a rear-most arm, said front-most arm having a substantially uniform transverse cross section along its length, and a groove in the upper surface of the load carrier extending in said first given direction and substantially uniformly sized widthwise to accommodate therein said front-most arm, said groove having a depth uniformly greater than a height of said front-most arm.

7. The material handling system of claim 6, wherein said horizontal passage extends below a lowermost horizontal support surface of the staging structure.

8. The material handling system of claim 1, wherein said moving means moves said carriage assembly along a path placing said vertically extending column at least at a preselected distance from a front-most portion of the horizontal supporting surface of the loading station.

9. The material handling system of claim 8, wherein the front-most portion of the horizontal supporting surface of the loading station is in a vertical plane extending parallel to both the first given direction and the vertically extending column.

10. The material handling system of claim 1, wherein said means for permitting relative vertical movement between the load carrier and the supporting surface of the loading station comprises a first plurality of elongated spaces defined in said load carrier, open at a distal end thereof, and extending toward the column along said second given direction, and a second plurality of elongated spaces defined in said supporting surface of the loading station, open at the front, and extending toward the back along said second given direction, said first and second plurality of spaces being sized such as to accommodate vertical passage of the load carrier through a supporting surface in said overlapping position.

11. The material handling system of claim 1, wherein said means for permitting relative vertical movement between the load carrier and supporting surface of the loading station comprises a plurality of arms mounted on the horizontal supporting surface of the loading station to extend along said first given direction and including a front-most arm and a rear-most arm, said front-most arm having a substantially uniform transverse cross section along its length, and a groove in the upper surface of the load carrier extending in said first given direction and substantially uniformly sized widthwise to accommodate therein said front-most arm, said groove having a depth uniformly greater than a height of said front-most arm.

12. The material handling system of claim 1, wherein the front of the staging structure is at least partially open at said vertical space between adjacent horizontal surfaces to accommodate the load carrier as it reaches said overlapping position by entering such vertical space from said at least one open side thereof.

13. The material handling system of claim 1, wherein said means for permitting relative vertical movement between the load carrier and supporting surfaces of the staging structure comprises a first plurality of elongated spaces defined in said load carrier, open at a distal end thereof, and extending toward the column along said second given direction, and a second plurality of elongated spaces defined in said supporting surfaces of the staging structure, open at the front, and extending toward the back along said second given direction, said first and second plurality of spaces being sized such as to accommodate vertical passage of the load carrier through a supporting surface in said overlapping position.

14. The material handling system of claim 1, wherein said horizontal passage extends below a lowermost horizontal support surface of the staging structure.

* * * * *